(12) United States Patent
Kawamoto et al.

(10) Patent No.: US 7,692,816 B2
(45) Date of Patent: Apr. 6, 2010

(54) IMAGE PROCESSING APPARATUS, IMAGE PROCESSING METHOD, AND COMPUTER PRODUCT

(75) Inventors: Hiroyuki Kawamoto, Kanagawa (JP); Atsushi Togami, Kanagawa (JP); Toshimi Yamamura, Kanagawa (JP); Satoshi Ohkawa, Tokyo (JP); Yasunobu Shirata, Tokyo (JP); Toshiya Hikita, Tokyo (JP); Takeharu Tone, Kanagawa (JP); Shuji Kimura, Kanagawa (JP); Takumi Nozawa, Kanagawa (JP); Tomoyuki Yoshida, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 804 days.

(21) Appl. No.: 11/498,153

(22) Filed: Aug. 3, 2006

(65) Prior Publication Data

US 2007/0030504 A1    Feb. 8, 2007

(30) Foreign Application Priority Data

Aug. 4, 2005    (JP) .............................. 2005-227081

(51) Int. Cl.
    *G06F 15/00*    (2006.01)
(52) U.S. Cl. .................. 358/1.9; 358/538; 358/462
(58) Field of Classification Search ............... 358/1.9, 358/538, 462
    See application file for complete search history.

(56) References Cited

U.S. PATENT DOCUMENTS 5,706,368 A * 1/1998 Mita .......................... 382/284
6,665,096 B1 * 12/2003 Oh .............................. 358/461

FOREIGN PATENT DOCUMENTS

| JP | 01-135268 | 5/1989 |
| JP | 01-174452 | 7/1989 |
| JP | 07-303189 | 11/1995 |
| JP | 09-272244 | 10/1997 |
| JP | 2000-022971 | 1/2000 |
| JP | 2000-333026 | 11/2000 |
| JP | 2001-100969 | 4/2001 |
| JP | 2001-100970 | 4/2001 |
| JP | 2004-128882 | 4/2004 |
| JP | 2004-159035 | 6/2004 |

OTHER PUBLICATIONS

Japanese Office Action dated Oct. 27, 2009.

* cited by examiner

*Primary Examiner*—Twyler L Haskins
*Assistant Examiner*—Michael Burleson
(74) *Attorney, Agent, or Firm*—Harness, Dickey & Pierce, P.L.C.

(57) ABSTRACT

When first image data, which is in a first color space, is converted into second image data, which is in a second color space corresponding to an image output unit. Upon converting the image data, if the first image data is color data, background removal process is switched OFF. Otherwise, the background removal process is switched ON. Thus, it is possible to obtain an image desired by a user.

17 Claims, 9 Drawing Sheets

IMAGE PROCESSING APPARATUS, IMAGE PROCESSING METHOD, AND COMPUTER PRODUCT

CROSS-REFERENCE TO RELATED APPLICATIONS

The present document incorporates by reference the entire contents of Japanese priority document, 2005-227081 filed in Japan on Aug. 4, 2005.

BACKGROUND OF THE INVENTION

1. Field of the Invention

The present invention relates to a technology for removing background from an image.

2. Description of the Related Art

Recent progress in networking of copiers allows a user to use functions of a copier from another terminal connected to the copier via a network. For example, it has been proposed, and increasingly used, to deliver image data input to a digital color multifunction product (e.g., image data read by a scanner) to another terminal such as a computer connected to the digital color multifunction product via a network.

In the case of delivery of scanned image data, various processing conditions are set from the digital color multifunction product or the terminal at a delivery destination. According to the processing conditions, image data is read by a scanner, subjected to predetermined processing such as conversion, and sent to the delivery destination.

Japanese Patent Application Laid-Open No. 2000-333026 discloses a conventional technology concerning image scanning, image processing, etc. performed to deliver scanned image data. In the conventional technology, a system includes an image forming unit, such as a copier, with an expansion box based on the architecture of a general-purpose computer system as a server to enhance the functions. Scanned images are stored in a hard disk in the expansion box, and image files stored therein are shared by computer systems connected to a network, which can be realized by their server functions.

Besides, upon using a scan box function (one of the functions of delivering a scanned image to a client computer), a scanned image is processed in such a manner as follows. An original image is scanned and processed according to processing conditions set by input operation. Because the scan box function is used when an image is not to be necessarily printed out, a yellow, magenta, cyan and black (YMCK) data format for printout is not created. In other words, color coordinate conversion of a scanned image from red, green, blue (RGB) to YMCK, gradation correction, compression of image data, etc. are not performed, and RGB data is stored in a scan box. A client computer on a network obtains the RGB data from the scan box, and transfers the RGB data to a local disk or the like, i.e., a storage of the client computer. The client computer displays the scanned image on a monitor screen based on the RGB data.

As described above, in the conventional technology, it is not that RGB data of a scanned image is directly stored in a hard disk and the image format of stored data is converted to deliver the stored data on the basis that image data in RGB data format is used in a computer terminal at a delivery destination. Therefore, for clients that request delivery of stored data under different image format conditions, the format of the data may not be converted to meet the requests. In the case of an image processing apparatus having a delivery function with an image forming unit such as a copier, there is an advantage that productivity of image formation can be improved by storing an input image in a dedicated data format convenient for image formation. With the RGB data format as in the conventional technology, this advantage cannot be used.

For this reason, there is recently a demand for a function of converting RGB image data stored in a scan box into CMYK data and, then, delivering the CMYK data to an apparatus with an image forming unit such as a copier.

Japanese Patent Nos. 2602681 and 2627753 disclose a color image processing apparatus and a color image processing method for converting RGB data into CMYK data.

Incidentally, the digital color multifunction product and the like perform background removal for correcting the density of the background color of an image for read RGB signals. There are various algorithms for detecting the background color of an image to correct the density. However, with all the algorithms, the correction is performed assuming that a detected background color is white. Thus, the balance of RGB varies according to whether background removal process is ON or OFF, which leads to the problem of color changes. In particular, this poses a significant problem in a color mode in which faithful reproduction of highlight color tint is required.

SUMMARY OF THE INVENTION

It is an object of the present invention to at least partially solve the problems in the conventional technology.

According to an aspect of the present invention, an image processing apparatus that includes an image output unit, and outputs image data through the image output unit, comprises: an image-data acquiring unit that acquires first image data in a first color space; an image storing unit that stores therein the first image data; an image-data converting unit that converts the first image data present in the image storing unit into second image data in a second color space corresponding to the image output unit; and a mode setting unit that accepts output mode setting for image processing in the image output unit. The image-data converting unit includes a background removing unit that performs background removal process of detecting a background color of the first image data when converting the first image data into the second image data, and correcting density of the background color; and a background-removal switching unit that switches ON and OFF the background removal process based on the output mode setting.

According to another aspect of the present invention, an image processing method comprising: converting first image data, which is in a first color space, into second image data, which is in a second color space corresponding to an output image; and accepting output mode setting for the output image. The converting includes performing background removal process of detecting a background color of the first image data when converting the first image data into the second image data, and correcting density of the background color; and switching ON and OFF the background removal process based on the output mode setting.

According to still another aspect of the present invention, a computer-readable recording medium stores therein a computer program that implements the above method on a computer.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

A first embodiment of the present invention is explained with reference to FIGS. 1 to 7. In this embodiment, a digital color multifunction product is taken as an example of an image processing apparatus. In the digital color multifunction product, a copy function, a facsimile (FAX) function, a printer function, and a function of delivering an input image (a read image or an image input by the printer function or the FAX function) are combined.

Figure 1:
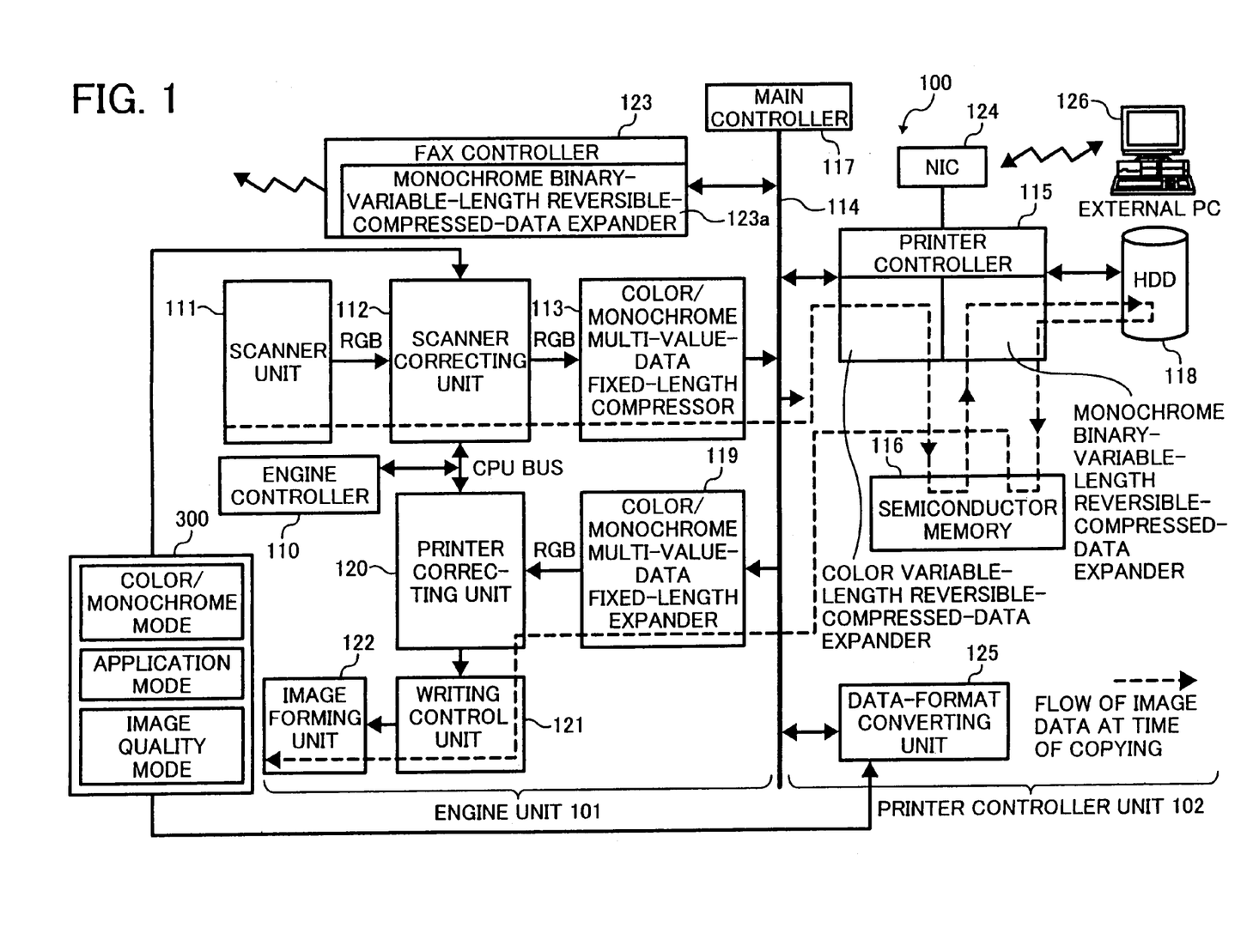
FIG. 1 is a block diagram of a digital color multifunction product according to a first embodiment of the present invention and a flow of image data at the time of copying.

FIG. 1 is a block diagram of a digital color multifunction product (image processing apparatus) 100 according to this embodiment and a flow of image data at the time of copying. The digital color multifunction product 100 includes a main controller 117 having a microcomputer configuration. The main controller 117 intensively controls the entire digital color multifunction product 100. The digital color multifunction product 100 consists of roughly an engine unit 101 and a printer controller unit 102.

Operations of the respective units of the digital color multifunction product 100 are explained referring to FIG. 1 with the flow of image data at the time of copying.

The engine unit 101 includes an engine controller 110 that controls the entire engine unit 101, a scanner unit 111 that reads an image, and a scanner correcting unit 112. The scanner unit 111 (image reading unit) reads an image as image data, which is separated into R, G, and B colors and is sent to the scanner correcting unit 112 (image-data acquiring unit). The scanner correcting unit 112 performs color conversion from RGB signals peculiar to the apparatus read by the scanner unit 111 into RGB signals in the standard color space. The conversion into the RGB signals in the standard color space is performed to reuse the image data.

Figure 2:
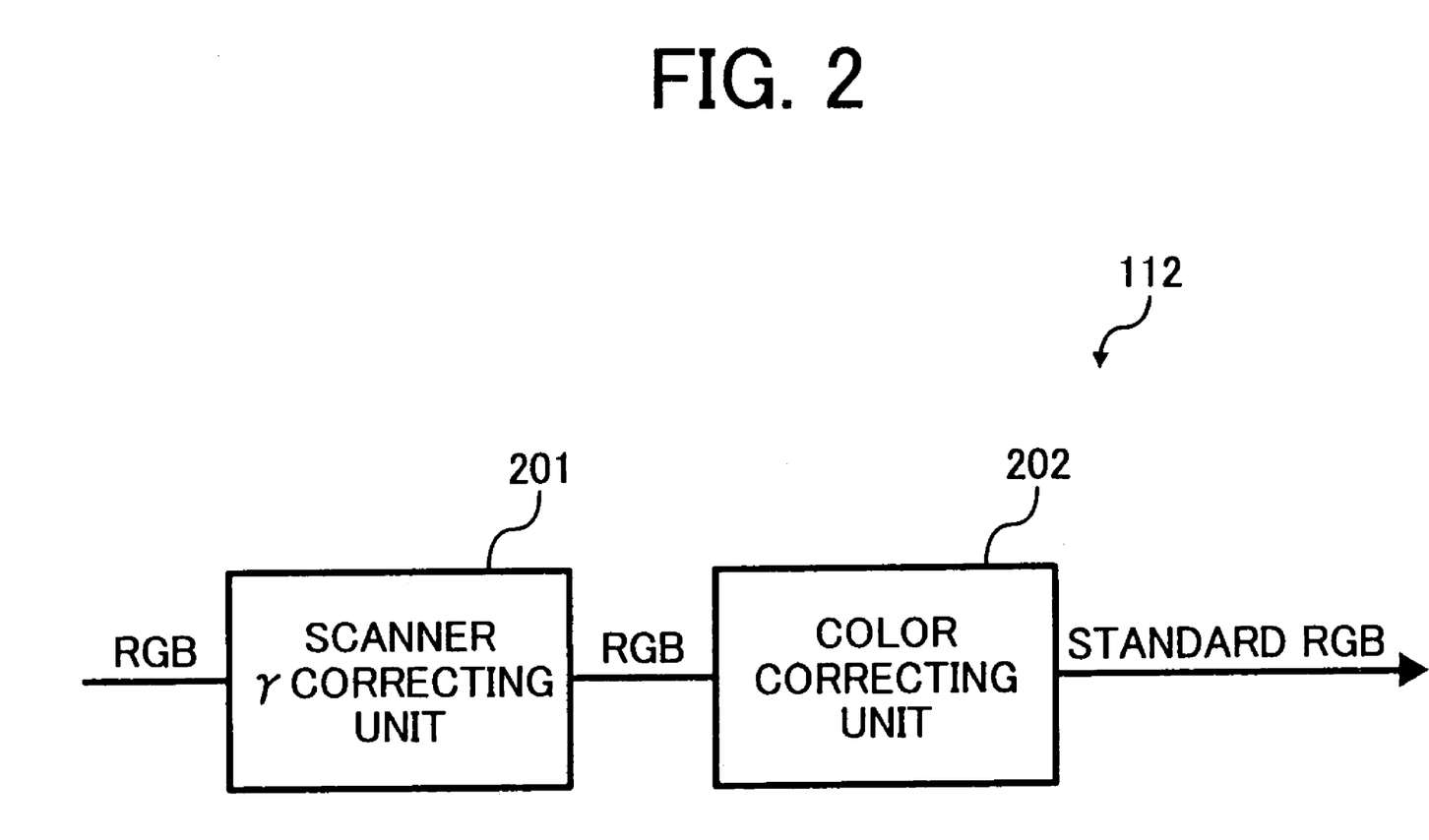
FIG. 2 is a block diagram of a scanner correcting unit shown in FIG. 1.
Figure 3:
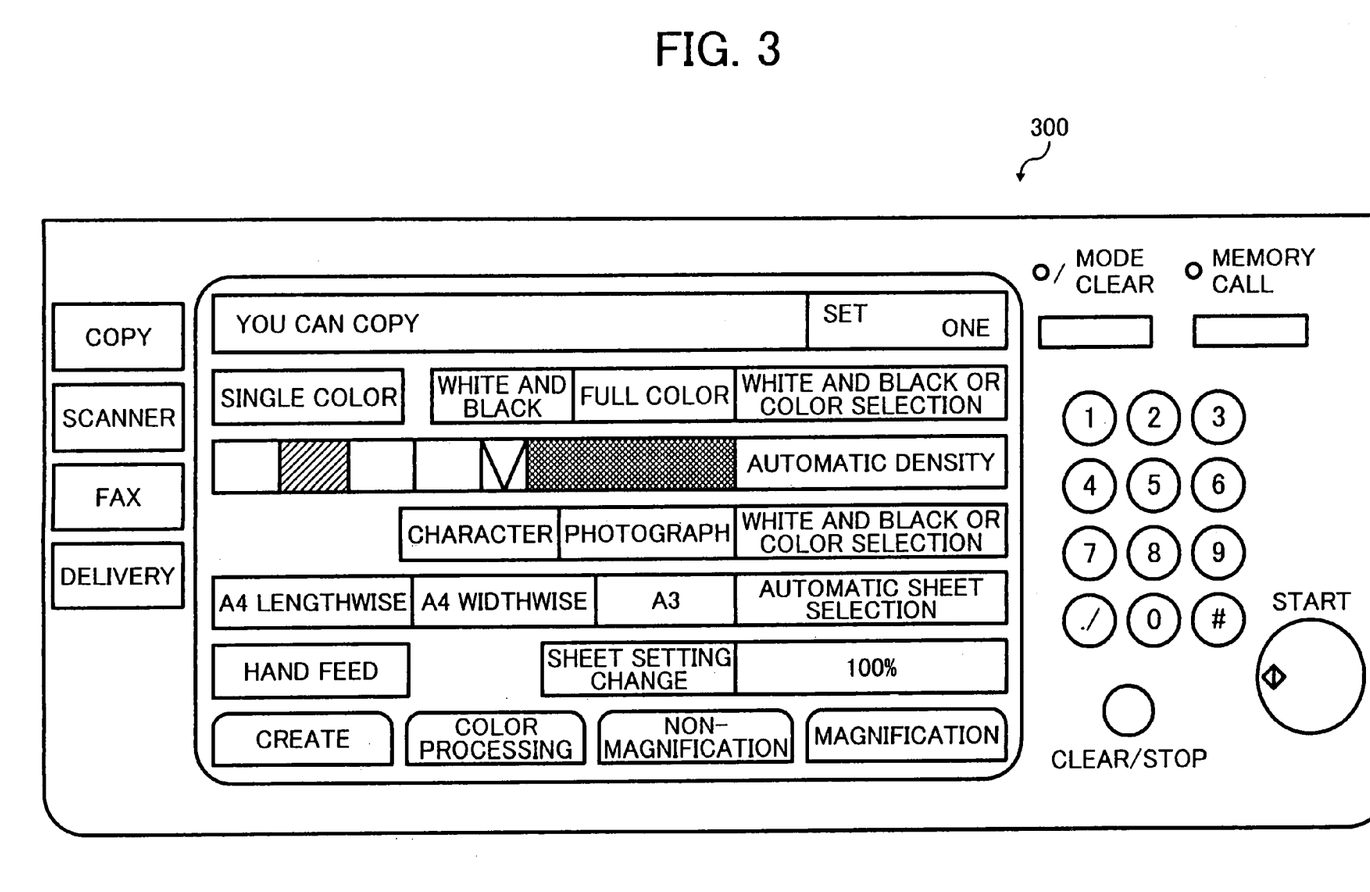
FIG. 3 is a plan view of an operation panel shown in FIG. 1.

As shown in FIG. 2, the scanner correcting unit 112 includes a scanner γ correcting unit 201 that performs scanner γ correction and a color correcting unit 202 that performs color correction. More specifically, the scanner γ correcting unit 201 is a look-up table (LUT) with 8-bit input and 8-bit output for each channel of RGB. The color correcting unit 202 may use linear conversion with a 3×3 matrix from input RGB to output RGB or may use a three-dimensional LUT. The type of processing reflects a processing mode selected by a user. The processing mode is set through the main controller 117 according to, for example, an input by the user from an operation panel 300 externally provided to the digital color multifunction product 100 as shown in FIG. 3. Processing modes that can be selected by the user include a color/monochrome mode, an application mode, and an image quality mode. Specifically, the color/monochrome mode includes a full color mode, a single color mode, and a white and black mode. The application mode includes a copy mode, a scanner mode, a FAX mode, and a delivery mode. The image quality mode includes a character mode, a character and photograph mode, and a photograph mode. Further, the user can specify, for example, notch information to adjust the color density of an image.

After the processing in the scanner correcting unit 112, a color/monochrome multi-value-data fixed-length compressor 113 converts data with 8 bits per color into data with n bits ($n \leq 8$) per color. The image data after the compression is sent to a printer controller 115 via a general-purpose bus 114.

The printer controller 115 includes a semiconductor memory 116 that stores therein image data. Image data sent under the control of the main controller 117 is stored in the semiconductor memory 116. The image data (image data in a first color space) stored in the semiconductor memory 116 and information on a processing mode input through the operation panel 300 are stored in a hard disk or a hard disk drive (HDD) 118 serving as a storing unit (image storing unit). This is for the purpose of preventing the same data from being read again even when printing does not complete normally due to a paper jam at the time of printout by the digital color multifunction product 100. This is also for the purpose of performing electronic sort. Besides, in recent years, the hard disk 118 further includes a function of storing data read and outputting the data if necessary. In other words, the image data is once loaded into the semiconductor memory 116, and then stored in the hard disk 118.

When the image data is output, the image data in the hard disk 118 is once loaded into the semiconductor memory 116 of the printer controller 115, and sent to the engine unit 101 via the general-purpose bus 114. When the engine unit 101 receives the image data, a color/monochrome multi-value-data fixed-length expander 119 converts the image data into RGB image data with 8 bits per color. The image data after the conversion is sent to a printer correcting unit 120. Although the color/monochrome multi-value-data fixed-length compressor 113 and the color/monochrome multi-value-data fixed-length expander 119 are shown in FIG. 1, a general-purpose compressor and a general-purpose expander can be used instead. As described above, the image data stored in the hard disk 118 is once loaded into the semiconductor memory 116 before being output to the engine unit 101 because writing and reading speed of the hard disk 118 is not fixed and irregular. The printer correcting unit 120 (image-data converting unit) converts the RGB image data (the image data in the first color space) read from the hard disk 118 into CMYK color signals (image data in a second color space) corresponding to an image forming unit 122 (image output unit).

Figure 4:
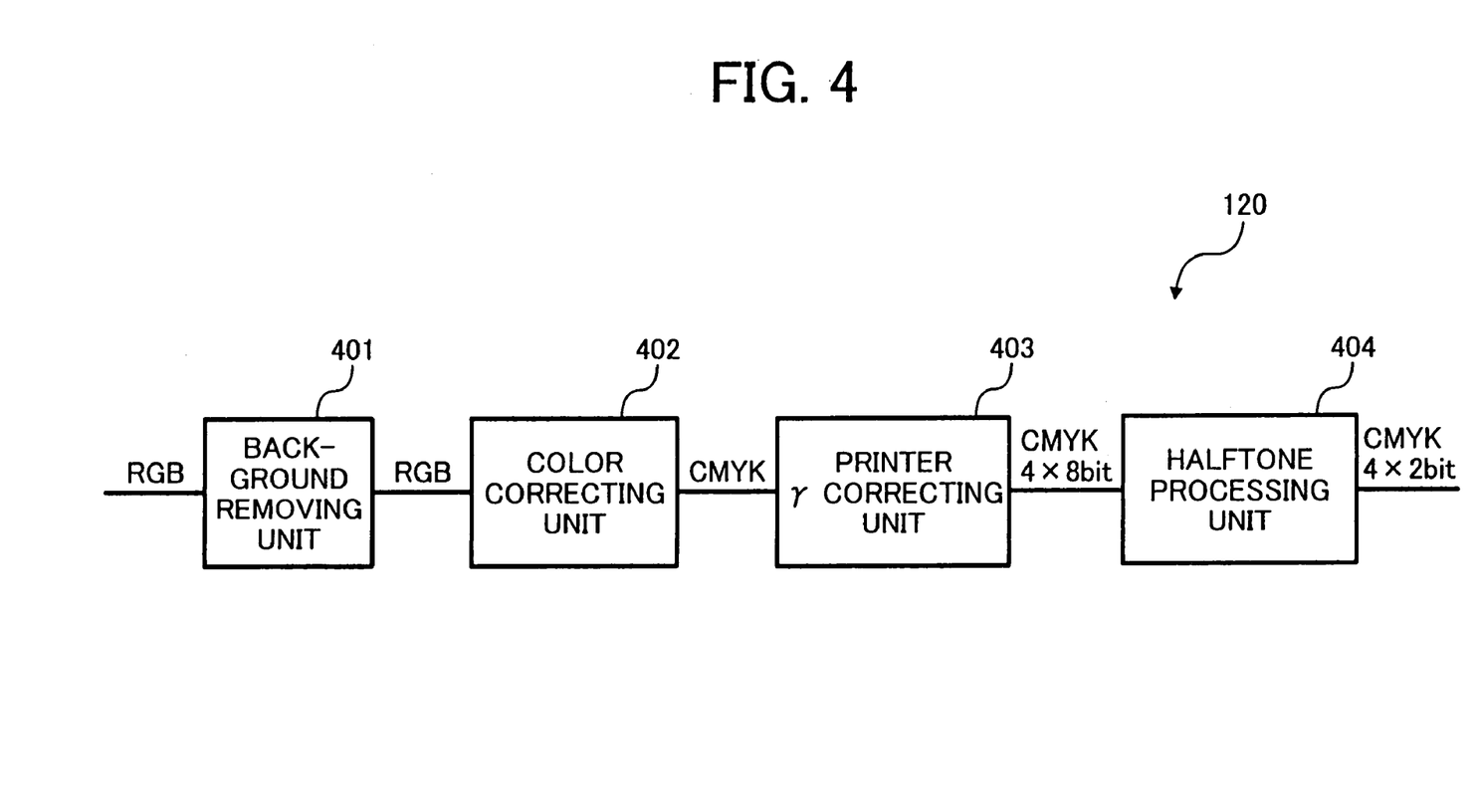
FIG. 4 is a block diagram of a printer correcting unit shown in FIG. 1.

As shown in FIG. 4, the printer correcting unit 120 includes a background removing unit 401, a color correcting unit 402, a printer γ correcting unit 403, and a halftone processing unit 404 that perform background removal, color correction, printer γ correction, and halftone processing for the RGB image data with 8 bits per color, respectively. More specifically, the background removing unit 401 performs background removal for correcting the density of the background color of an image. The color correcting unit 402 converts the input RGB image data into CMYK color signals. The printer γ correcting unit 403 applies printer γ correction to respective colors of CMYK. The halftone processing unit 404 performs halftone processing corresponding to a writing control unit 121 and the image forming unit 122 for the respective colors, sends the respective colors to the next stage as data used for image formation, and outputs the data to a transfer sheet. The type of processing reflects a processing mode selected by the user, that is, a processing mode stored in the hard disk 118.

The image forming unit 122 can use various printing methods such as electrophotographic printing, ink-jet system, sublimation dye transfer printing, silver salt photography, direct thermosensitive recording, and thermofusible transfer printing.

Figure 5:
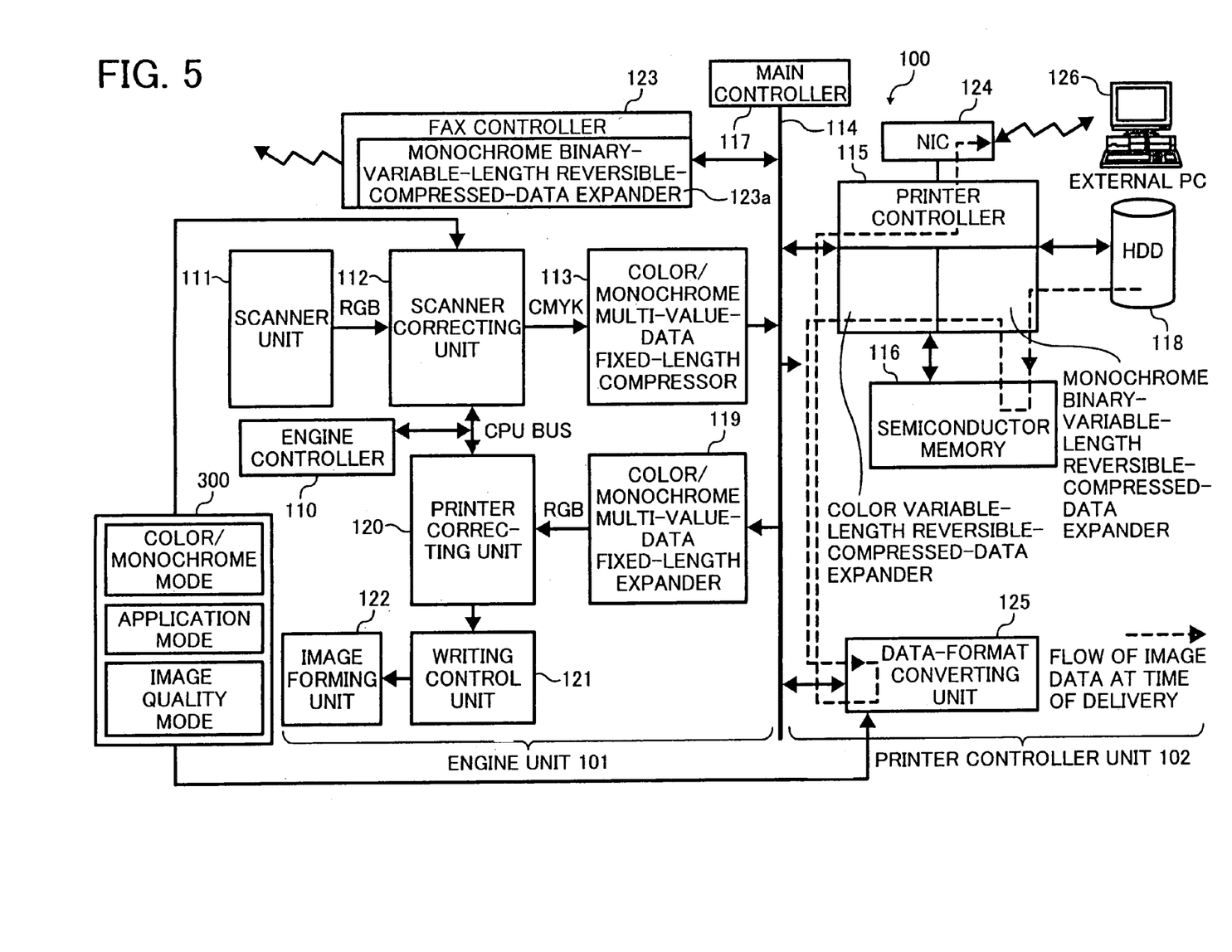
FIG. 5 is a block diagram of a flow of image data at the time when data stored in a hard disk is delivered to an external PC.

Referring to FIG. 5, operations of the respective units of the digital color multifunction product 100 are explained with a flow of image data at the time when data stored in the hard disk 118 is delivered to an external personal computer (PC) 126.

A network interface controller (NIC) 124 is an interface for connecting the digital color multifunction product 100 to a network such as a LAN to which the external PC 126 is connected.

As described above, the RGB image data (the image data in the first color space) subjected to scanner correction, that is, image processing for copying, and the information on a processing mode input from the operation panel 300 are stored in the hard disk 118. The processing mode is set according to, for example, an input by the user from the operation panel 300 (mode setting unit and application-mode setting unit) externally provided to the digital color multifunction product 100 as shown in FIG. 3. Processing modes that can be selected by the user are a color/monochrome mode, an application mode, and an image quality mode. Specifically, the color/monochrome mode includes a full color mode, a single color mode, and a white and black mode. The application mode includes a copy mode, a scanner mode, a FAX mode, and a delivery mode. The image quality mode includes a character mode, a character and photograph mode, and a photograph mode. Further, the user can specify, for example, notch information to adjust the color density of an image.

The image data stored in the hard disk 118 is once loaded into the semiconductor memory 116 of the printer controller 115, and sent to a data-format converting unit 125 via the general-purpose bus 114. At this time, the information on the processing mode is also sent to the data-format converting unit 125.

Figure 6:
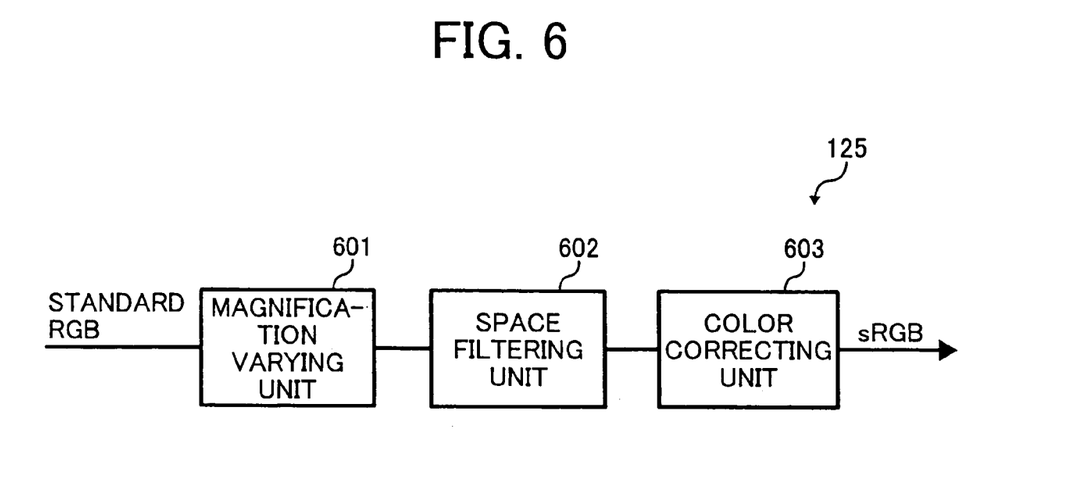
FIG. 6 is a block diagram of a data-format converting unit shown in FIG. 1.

The data-format converting unit 125 performs, for the image data, image processing suitable for the processing mode. The data-format converting unit 125 also performs appropriate image format processing to deliver the image data to the external PC 126 through the NIC 124. For example, as shown in FIG. 6, the data-format converting unit 125 includes a magnification varying unit 601, a space filtering unit 602, and a color correcting unit 603 that perform the variation of magnification, space filtering, and color correction for RGB image data. More specifically, the magnification varying unit 601 expands and compresses an image by a known technique such as a cubic convolution. The space filtering unit 602 corrects image blur or the like using a space filter of about 5×5, and emphasizes an image according to an image quality mode. The color correcting unit 603 performs conversion from a standard RGB color space into a color space corresponding to an output device. The type of processing reflects a processing mode selected by the user, that is, a processing mode stored in the hard disk 118. The external PC 126 can inform the digital color multifunction product 100 of a processing mode designated for image data desired to be acquired. In this case, the main controller 117 detects the processing mode informed from the external PC 126, and notifies the data-format converting unit 125 of the processing mode. The data-format converting unit 125 converts a format of the image data to be adapted to the desired processing mode informed from the external PC 126.

In this way, the data-format converting unit 125 performs image format processing appropriate to delivery for the image data, and delivers the image data to the external PC 126 through the NIC 124.

A flow of image data at the time of facsimile transmission is not specifically shown in the figure. However, the FAX controller 123 controls the FAX function of the digital color multifunction product 100 to transmit and receive image data to and from a predetermined network such as a telephone line. A monochrome binary-variable-length reversible-compressed-data expander 123a performs compresses and expands data transmitted and received.

The digital color multifunction product 100 can operate as a printer that prints out image data received from the external PC 126 via a network. In this case, having received data through the NIC 124 (image-data acquiring unit), the digital color multifunction product 100 analyzes an image and a command for print instruction based on the data input, expands a bitmap to a state in which the data can be printed as image data, and compresses the data expanded to store the data in the semiconductor memory 116. The data stored in the semiconductor memory 116 is written in the large-capacity hard disk 118 whenever necessary.

In the above explanation, the image data compressed in the RGB color space subjected to the image processing for copying is stored in the hard disk 118. The image data stored in the hard disk 118 is image data in a certain color space read as a copy image by the digital color multifunction product 100 or the like. The color space can be a device-dependent color space, such as YUV (luminance: Y, and chrominance: U and V), and cyan, magenta and yellow (CMY) color spaces (depending on a type of a device or a device characteristic) or can be a device-independent color space (sRGB) (not depending on a type of a device or a device characteristic). When a signal in a color spaces is transmitted to another device via a network, the color space is corrected to a color space compatible with that used by the other device. The color spaces include a standard sRGB space or Lab (lightness: L, red-green: a, and blue-yellow: b) space, and a dedicated color space that can be shared among different apparatuses.

The main controller 117 is briefly explained. The main controller 117 has a microcomputer configuration including a central processing unit (CPU) that intensively controls the respective units, a read only memory (ROM) serving as a storage medium in which fixed data such as a startup program executed by the CPU is written, and a random access memory (RAM) in which variable data such as work data is written to be freely updated. The main controller 117 includes a nonvolatile ROM. An application program executed by the CPU is stored in the nonvolatile ROM. When the user turns on a power supply, the CPU invokes the startup program in the ROM, loads the application program from the nonvolatile ROM into the RAM, and invokes this application program. Consequently, the CPU operates according to the application program, and thereby the main controller 117 controls operations of the entire digital color multifunction product 100.

The application program can be, for example, downloaded from the outside through the NIC 124 and installed in the nonvolatile ROM.

Among the various functions of the digital color multifunction product 100 described above, characteristic functions realized when the CPU of the main controller 117 operates according to an application program are explained.

As described above, the digital color multifunction product 100 directly stores RGB data of a scanned image in the hard disk 118, and converts an image format for the stored data when printing or delivering the stored data. In other words, the digital color multifunction product 100 according to this embodiment can output stored color image data directly as color data, or convert the image data into monochrome data and output the monochrome data.

For example, when a stored color image data is converted into monochrome data and printed out, the color correcting unit 402 of the printer correcting unit 120 shown in FIG. 4 converts color to monochrome. Assuming herein that the user intends to output the image data to paper, conversion from RGB to K (black) is performed. In the case of delivery, luminance Y is obtained from an original RGB value, and reflected in RGB after the conversion.

When the user designates color printing, in many cases, it is considered that the user wishes color reproduction faithful to an original image. In the digital color multifunction product 100 according to this embodiment, however, the background removing unit 401 of the printer correcting unit 120 performs the background removal for correcting the density of the background color of an image. The background removal leads to color changes, which poses a problem in a color mode required to faithfully reproduce highlight color tint.

Thus, in the digital color multifunction product 100 according to this embodiment, the background removal process in the background removing unit 401 is switched ON/OFF according to the setting of the color/monochrome mode.

Figure 7:
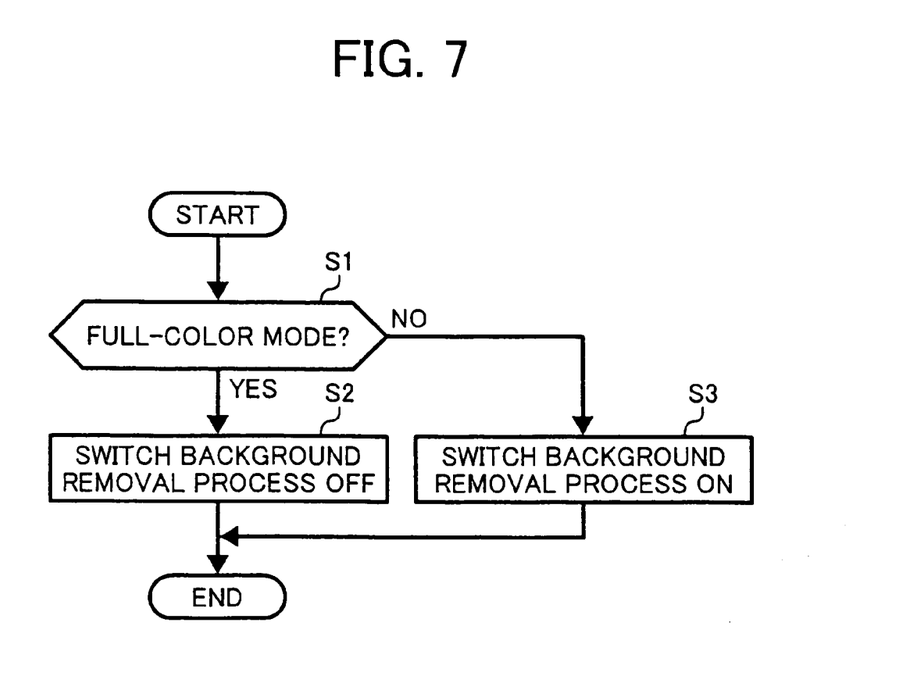
FIG. 7 is a flowchart of the operation performed by a background removing unit shown in FIG. 4.

FIG. 7 is a flowchart of the operation performed by the background removing unit 401. As shown in FIG. 7, when a full color mode is specified in color/monochrome mode setting ("Yes" at step S1), the background removal process is switched OFF in the background removing unit 401 (step S3).

On the other hand, when the full color mode is not specified in the color/monochrome mode setting ("No" at step S1), the background removal process is switched ON in the background removing unit 401 (step S2).

In this way, the background removal process is switched ON/OFF in the background removing unit 401 according to the color/monochrome mode setting designated when an image stored in the hard disk 118 is output. This achieves an image desired by the user.

The user is informed of ON/OFF state of the background removal process switched as above in the background removing unit 401 by, for example, display on the operation panel 300 (informing unit) externally provided to the digital color multifunction product 100. This allows the user to surely learn the ON/OFF state of the background removal process.

As described above, according to this embodiment, upon converting the image data of the first color space stored in the hard disk 118 into the image data in the second color space corresponding to the image output unit, when the color mode is specified in the color/monochrome mode setting, the background removal process is switched OFF and, when the color mode is not specified in the color/monochrome mode setting, the background removal process is switched ON. Thereby, it is possible to achieve an image desired by the user.

In the above explanation, the background removal process is switched ON/OFF in the background removing unit 401 according to the color/monochrome mode setting input by the user through the operation panel 300. However, such ON/OFF switching control is explained by way of example and without limitation. For example, the color/monochrome mode can be automatically set according to an application mode. This is because, when determining a default setting, the user may prefer the color mode when using delivery mode that does not charge fees but prefer the monochrome mode with less charge when using copy mode that charges fees. In other words, the color/monochrome mode can be automatically set according to the application mode setting input by the user through the operation panel 300. Then, the background removal process can be switched ON/OFF in the background removing unit 401 according to the color/monochrome mode setting. This allows the user to reuse stored information at low cost.

A second embodiment of the present invention is explained with reference to FIGS. 8 to 10. Components identical with those in the first embodiment are denoted by the identical reference numerals and characters, and the same description is not repeated.

In the first embodiment, the background removal process is switched ON/OFF in the background removing unit 401 according to the color/monochrome mode setting input by the user through the operation panel 300. However, in the digital color multifunction product 100 according to the second embodiment, it is automatically determined whether an original image is color or monochrome, and the background removal process is switched ON/OFF in the background removing unit 401 according to a result of the determination.

Figure 8:
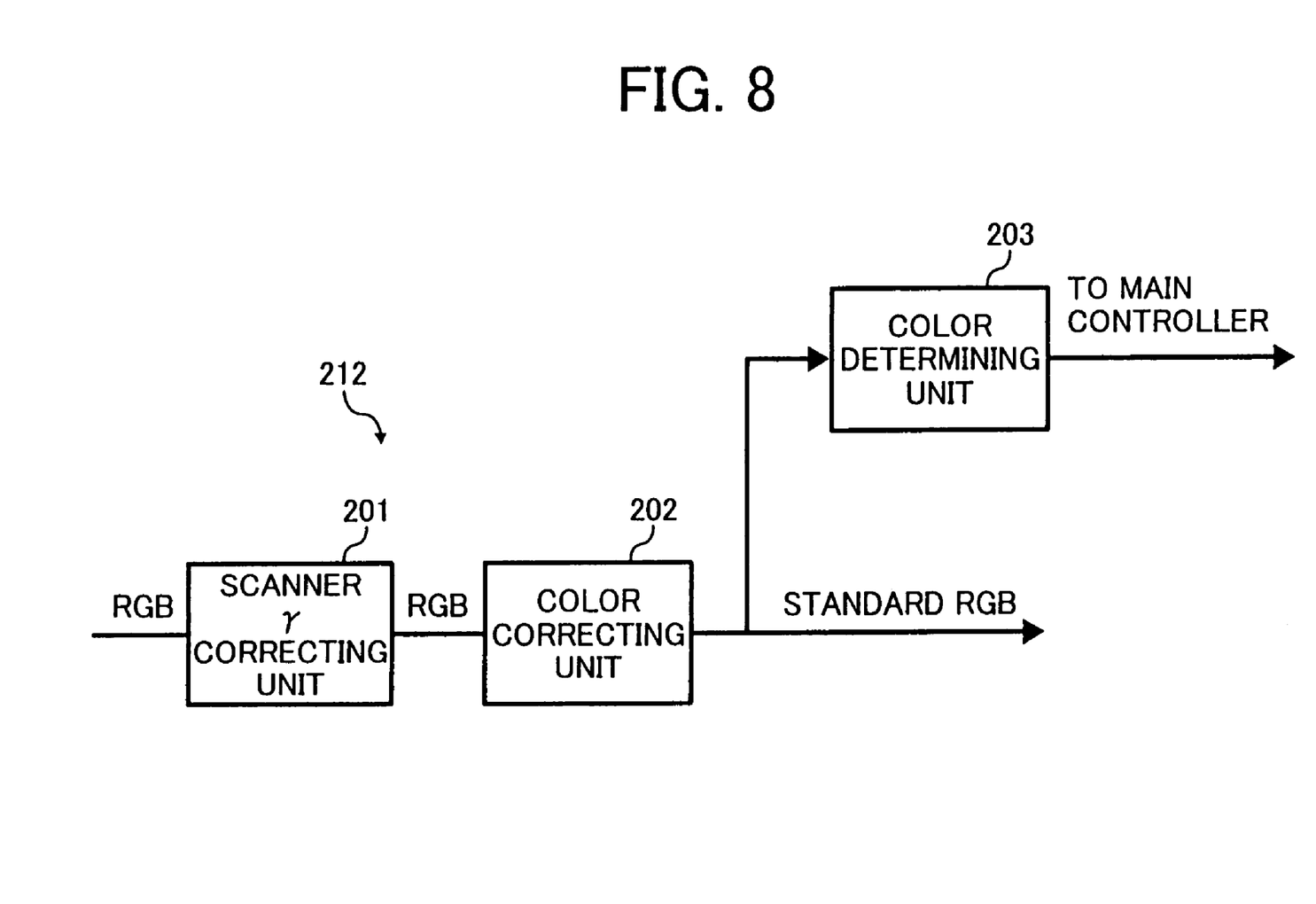
FIG. 8 is a block diagram of a scanner correcting unit according to a second embodiment of the present invention.

FIG. 8 is a block diagram of a scanner correcting unit 212 according to the second embodiment. The scanner correcting unit 212 is basically similar in construction to the scanner correcting unit 112 except that the scanner correcting unit 212 includes a color determining unit 203 in addition to the scanner γ correcting unit 201 and the color correcting unit 202 explained in the first embodiment. The color determining unit 203 determines whether an original image is color or monochrome based on standard RGB image data subjected to the color correction by the color correcting unit 202. The determination as to whether the original image is color or monochrome can be made by applying image-area separation processing to the standard RGB image data. A result of the determination by the color determining unit 203 is output to the main controller 117.

Figure 9:
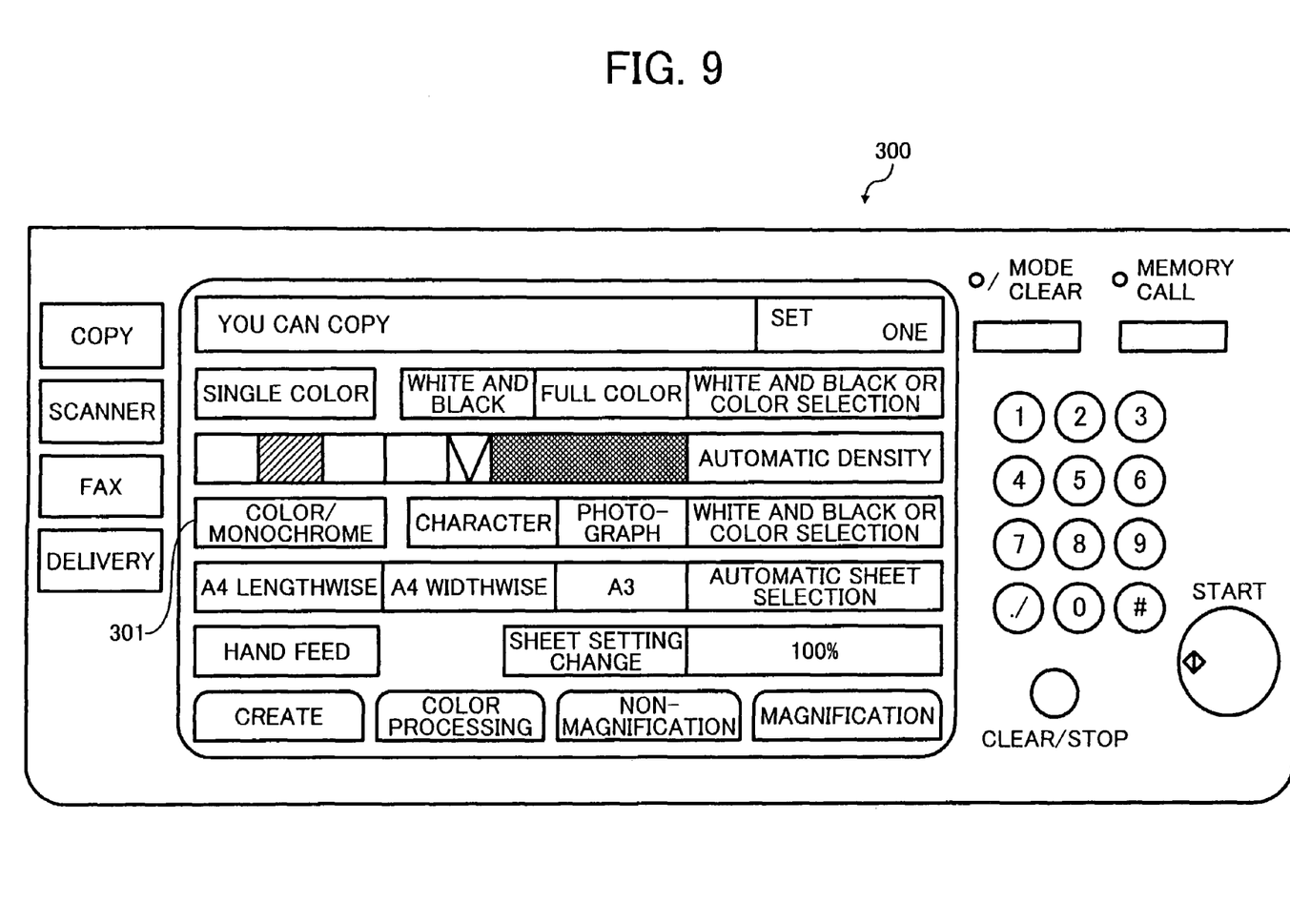
FIG. 9 is a plan view of an operation panel according to the second embodiment.

As shown in FIG. 9, a color/monochrome key 301 to set the automatic determination of whether an original image is color or monochrome is provided on the operation panel 300 of the digital color multifunction product 100 according to this embodiment.

When the color/monochrome key 301 is operated on the operation panel 300, an instruction to determine the color of an original image is issued to the color determining unit 203 of the scanner correcting unit 212 through the main controller 117 at the time of storing image data. After the image is read, a result of determination by the color determining unit 203 is reported to the main controller 117, and stored in the hard disk 118 in association with the image data.

Thus, in the digital color multifunction product 100 according to this embodiment, of the background removal process is switched ON/OFF in the background removing unit 401 according to a result of determination on a print object image in the color determining unit 203.

Figure 10:
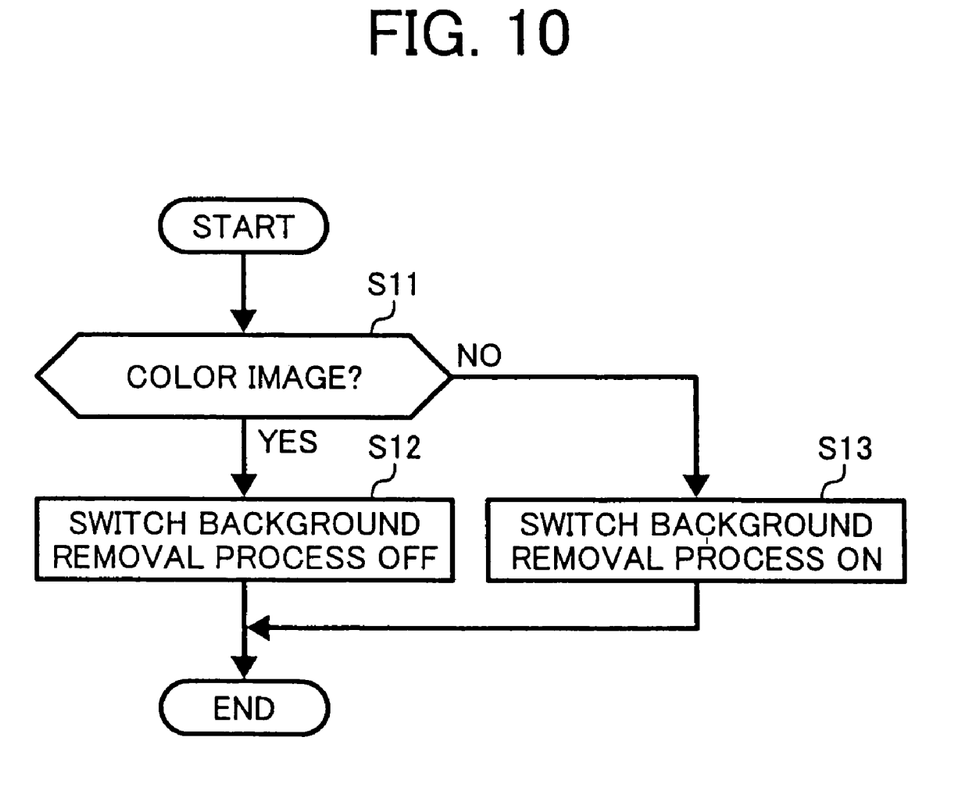
FIG. 10 is a flowchart of the operation performed by a background removing unit according to the second embodiment.

FIG. 10 is a flowchart of the operation performed by the background removing unit 401. When the color determining unit 203 determines that a print object image is a color image ("Yes" at step S11), the background removal process is switched OFF in the background removing unit 401 (step S12).

On the other hand, when the color determining unit 203 determines that a print object image is not a color image ("No" at step S11), the background removal process is switched ON in the background removing unit 401 (step S13).

In this way, upon outputting an image stored in the hard disk 118, the background removal process is switched ON/OFF in the background removing unit 401 according to a result of determination on a print object image in the color determining unit 203. This achieves an image desired by the user.

That is, when an image stored in the hard disk 118 is reused, a result of determination on the print object image in the color determining unit 203 is reported to the main controller 117. Then, the main controller 117 instructs the operation panel 300 to display color or monochrome, and the OFF/ON state of the background removal process. At the same time, the main controller 117 informs the printer correcting unit 120 whether color processing or monochrome processing is to be performed and whether background removal process is set to ON or OFF, and processing of an output application is performed.

As described above, according to this embodiment, since the color/monochrome mode is set based on a result of determination by the color determining unit 203, it is possible to reduce the operations of the user.

Incidentally, settings such as image quality mode and color density can be changed according to a result of determination as to whether a print object image is color or monochrome in the color determining unit 203. This further improves convenience for the user.

As set forth hereinabove, according to an embodiment of the present invention, the image data of the first color space stored in the storing unit is converted into the image data in the second color space corresponding to the image output unit. At this time, when the color mode is specified in the color/monochrome mode setting, the background removal process is switched OFF. Otherwise, the background removal process is switched ON. Thus, it is possible to obtain an image desired by a user.

Moreover, the color/monochrome mode is automatically set based on the application mode or a result of determination by the color determining unit. Accordingly, the operation of the user can be simplified.

Further, settings such as image quality mode and color density can be changed according to a result of determination by the color determining unit. Thereby, it is possible to further improve convenience for the user.

Still further, the user is informed of switching in the ON/OFF state of the background removal process, and can surely learn the ON/OFF state of the background removal process.

Furthermore, the image data in the first color space is acquired from the image scanner unit that scans an image. RGB data of the scanned image is directly stored in the storing unit. Thus, it is possible to convert the image format of the stored data upon printing or delivering the stored data.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus for processing image data comprising:
   an image output unit that includes a delivering unit for delivering the image data and a printing unit for printing the image data, the image output unit outputting the image data;
   an image-data acquiring unit that acquires first image data in a first color space that is an RGB space;
   an image storing unit that stores therein the first image data;
   an image-data converting unit that converts, at the time of outputting the image data, the first image data present in the image storing unit into second image data in a second color space that is a CMYK space corresponding to the image output unit;
   a mode setting unit that accepts an output mode for image processing in the image output unit, the output mode being a color mode or a monochrome mode, and
   an application-mode setting unit that accepts an application mode that is a delivering mode or a printing mode, wherein
   the image-data converting unit includes
      a background removing unit that performs background removal process of detecting a background color of the first image data when converting the first image data into the second image data, and correcting density of the background color; and
      a background-removal switching unit that switches ON and OFF the background removal process based on the output mode, and
   the image data converting unit determines that the output mode is the color mode when the application mode is the delivering mode, and determines that the output mode is the monochrome mode when the application mode is the printing mode.

2. The image processing apparatus according to claim 1, further comprising a color determining unit that determines whether the first image data is color or monochrome, wherein the image-data converting unit determines the output mode based on a determination by the color determining unit.

3. The image processing apparatus according to claim 2, wherein the image-data converting unit determines an image quality mode of the second image data according to the determination by the color determining unit.

4. The image processing apparatus according to claim 2, wherein the image-data converting unit adjusts a color density level of the second image data according to the determination by the color determining unit.

5. The image processing apparatus according to claim 1, further comprising an informing unit that informs ON and OFF state of the background removal process in the background removing unit switched by the background-removal switching unit.

6. The image processing apparatus according to claim 1, further comprising an image reading unit that reads image data of an original image, wherein the image-data acquiring unit acquires the image data read by the image reading unit as the first image data.

7. A computer-readable recording medium that stores therein a computer program causing a computer to execute:
   converting, at the time of outputting image data, first image data, in a first color space that is an RGB space into second image data in a second color space that is a CMYK space corresponding to an output image;
   accepting an output mode for the output image, the output mode being a color mode or a monochrome mode; and accepting an application mode that is a delivering mode or a printing mode, wherein the converting includes performing background removal process of detecting a background color of the first image data when converting the first image data into the second image data, and correcting density of the background color;

switching ON and OFF the background removal process based on the output mode, and determining that the output mode is the color mode when the application mode is the delivering mode, and determining that the output mode is the monochrome mode when the application mode is the printing mode.

8. The computer-readable recording medium according to claim 7, further causing the computer to execute determining whether the first image data is color or monochrome, wherein the output mode is determined based on a determination obtained at the determining.

9. The computer-readable recording medium according to claim 8, wherein an image quality mode of the second image data is determined according to the determination obtained at the determining.

10. The computer-readable recording medium according to claim 8, wherein a color density level of the second image data is adjusted according to the determination obtained at the determining.

11. The computer-readable recording medium according to claim 7, further causing the computer to execute informing ON and OFF state of the background removal process switched at the switching.

12. The computer-readable recording medium according to claim 7, further causing the computer to execute reading image data of an original image, wherein the acquiring includes acquiring the image data obtained at the reading as the first image data.

13. An image processing method comprising:

converting, at the time of outputting image data, first image data in a first color space that is an RGB space into second image data in a second color space that is a CMYK space corresponding to an output image;

accepting an output mode for the output image, the output mode being a color mode or a monochrome mode; and accepting an application mode that is a delivering mode or a printing mode, wherein the converting includes performing background removal process of detecting a background color of the first image data when converting the first image data into the second image data, and correcting density of the background color;

switching ON and OFF the background removal process based on the output mode; and determining that the output mode is the color mode when the application mode is the delivering mode, and determining that the output mode is the monochrome mode when the application mode is the printing mode.

14. The image processing method according to claim 13, further comprising determining whether the first image data is color or monochrome, wherein the output mode is determined based on a determination obtained at the determining.

15. The image processing method according to claim 14, wherein an image quality mode of the second image data is determined according to the determination obtained at the determining.

16. The image processing method according to claim 14, wherein a color density level of the second image data is adjusted according to the determination obtained at the determining.

17. The image processing method according to claim 13, further comprising informing ON and OFF state of the background removal process switched at the switching.

* * * * *